A. J. NELLIS.
Horse Hay-Forks.

No. 143,775. Patented Oct. 21, 1873.

Witnesses
Robt Wallace
Frederick Standish

Inventor
Aaron J. Nellis
by Bakewell Christy &c.
his atty's

UNITED STATES PATENT OFFICE.

AARON J. NELLIS, OF PITTSBURG, PENNSYLVANIA.

IMPROVEMENT IN HORSE HAY-FORKS.

Specification forming part of Letters Patent No. 143,775, dated October 21, 1873; application filed August 22, 1873.

*To all whom it may concern:*

Be it known that I, AARON J. NELLIS, of the city of Pittsburg, in the county of Allegheny and State of Pennsylvania, have invented a new and useful Improvement in Hay-Elevators; and I do hereby declare the following to be a full, clear, and exact description thereof, reference being had to the accompanying drawing forming a part of this specification, in which—

Figure 1:
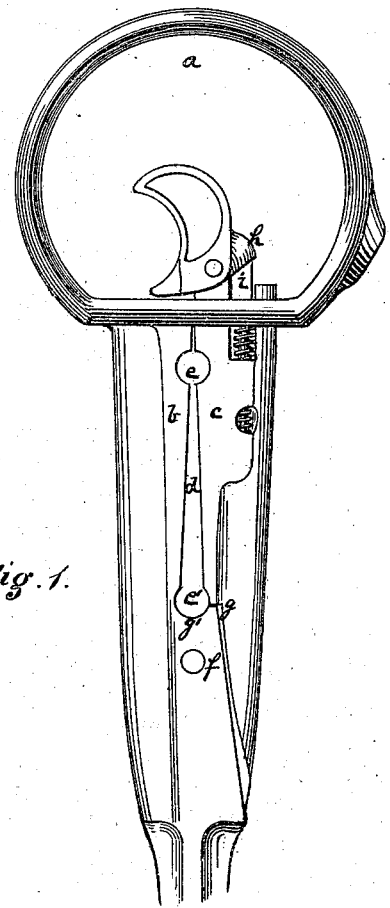
Figure 2:
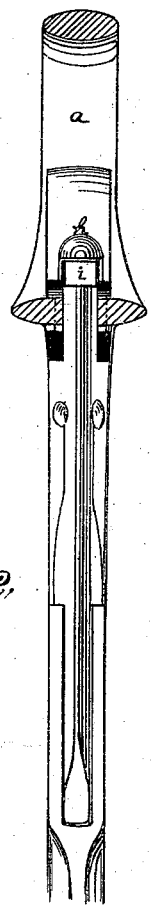

Figure 1 is a side view of a portion of a hay-elevator; and Fig. 2 is an edge view, partly in section, of the same.

Like letters of reference indicate like parts in each.

My invention consists of an improvement in the construction of hay-elevators whereby I am enabled to remedy defects in those heretofore in use.

To point out more specifically wherein consists my improvement, I will proceed with the description of the drawing, and explain as I go along the difference between the hay-elevator as constructed by me and those heretofore in use, and the defects in the latter which I propose to remedy.

This class of hay-forks have a hollow sheath-like case having a pointed end for penetrating the hay, and a pair of barbs connected with an operating-rod, which extends through the penetrator, and is connected at its upper end to a handle. By pushing down the handle the barbs are thrown out, and by drawing up the handle they are withdrawn into the sheath. The barbs may be locked in either position. When the fork is penetrating they are inside the sheath; then they are thrown out, so that the load of hay may be raised.

$a$ is a ring or handle at the head of the fork, which is attached to a center piece, $b$, the lower end of which extends down into the tubular rod or shaft of the fork, and is attached to the barbs which project from the lower end of the tubular rod. Pivoted to the shaft $b$ is a jaw, $c$, which extends up into the ring or handle $a$. Between the piece $b$ and the jaw $c$ is a vertical opening, $d$, in which the rod which extends across and sustains the tubular shaft rests. At each end of the opening $d$ is a round hole. These holes $e\ e'$ are designed to sustain the cross-rod of the tubular shaft while the fork is in one of two positions.

When the fork is made to penetrate a load of hay for the purpose of securing a hold in the same prior to elevating it, the penetrating-shaft of the fork rests upon the lower hole $e'$, and, when the fork has penetrated the load, the jaw $c$ is opened, and the handle $a$ is pushed down into the tubular penetrating-rod for the purpose of throwing out the barbs. This causes the cross-piece of the penetrator to ascend to the upper hole $e$, and then the jaws are locked. The fork with its load of hay is then raised to the loft, and, when at the proper place for discharging, the jaw $c$ is opened, and permits the tubular shaft to descend, so as to withdraw the barbs and release the load, which then drops off of the fork.

The jar consequent upon the dropping of the fork with the load from the top hole $e$ to the lower hole $e'$ causes the metal at the lower hole to be swaged out on both sides of the hole. Heretofore it has been customary to make the joint of the jaws at the lower side of the hole $e'$. I find that, by the jar caused by the fall of the penetrator, the sides of the hole $e'$ become spread and swaged up so as to crowd the displaced metal into the joint made by the two jaws. The results of this are, that the jaws are wedged apart and will not lock, and that the fork itself is weakened at the hinging-point $f$, so that, in course of time, it breaks off at that point. In order to overcome this difficulty, I make the joint between the two jaws at the side of the lower hole $e'$. This joint will be seen at $g$. Then the blow from the descending penetrator is received by the solid metal at $g'$, and, even if the metal at $g'$ is jammed up, no harm is done. Besides this, the fork is strengthened at the point $f$.

What I claim as my invention, and desire to secure by Letters Patent, is—

The solid or unjointed seat $g'$, formed by the hole $e'$ in one of the jaws of the hay-elevator described, substantially as and for the purposes set forth.

In testimony whereof I, the said AARON J. NELLIS, have hereunto set my hand.

AARON J. NELLIS.

Witnesses:
 FREDERICK STANDISH,
 T. B. KERR.